(12) United States Patent
Bannister et al.

(10) Patent No.: US 7,009,667 B2
(45) Date of Patent: Mar. 7, 2006

(54) LIQUID CRYSTAL REFLECTIVE DISPLAYS

(75) Inventors: Robert William Bannister, Worsc (GB); Ryan Michael Heath, Worsc (GB); Rachel Patricia Tuffin, Worsc (GB)

(73) Assignee: Qinetiq Limited, (GB)

( * ) Notice: Subject to any disclaimer, the term of this patent is extended or adjusted under 35 U.S.C. 154(b) by 5 days.

(21) Appl. No.: 10/476,345

(22) PCT Filed: May 2, 2002

(86) PCT No.: PCT/GB02/02018

§ 371 (c)(1),
(2), (4) Date: Oct. 29, 2003

(87) PCT Pub. No.: WO02/091070

PCT Pub. Date: Nov. 14, 2002

(65) Prior Publication Data

US 2004/0141123 A1   Jul. 22, 2004

(30) Foreign Application Priority Data

May 3, 2001 (GB) .................................. 0110826

(51) Int. Cl.
*G02F 1/1335* (2006.01)

(52) U.S. Cl. ........................................ 349/113
(58) Field of Classification Search ............ 349/113, 349/123; 427/510; 438/29, 32; 359/515, 359/534

See application file for complete search history.

(56) References Cited

U.S. PATENT DOCUMENTS

| 5,220,444 | A | * | 6/1993 | Mitsui et al. ............... 349/113 |
| 5,418,635 | A | * | 5/1995 | Mitsui et al. ............... 349/113 |
| 5,595,790 | A | | 1/1997 | Wei ........................... 427/510 |
| 5,714,247 | A | * | 2/1998 | Kuo et al. ................... 428/323 |
| 5,936,688 | A | * | 8/1999 | Tsuda et al. ................ 349/113 |
| 6,061,110 | A | | 5/2000 | Histake et al. ............. 349/113 |
| 6,097,459 | A | | 8/2000 | Shimada et al. ............ 349/113 |
| 6,184,949 | B1 | * | 2/2001 | Cornelissen et al. ......... 349/64 |
| 6,579,606 | B1 | * | 6/2003 | Uchiya et al. .............. 428/323 |

FOREIGN PATENT DOCUMENTS

| EP | 0 883 015 | 12/1998 |
| EP | 0 952 477 | 10/1999 |
| EP | 1 024 392 | 8/2000 |
| GB | 2338076 | 8/1999 |
| JP | 2000-035506 | * 2/2000 |

* cited by examiner

*Primary Examiner*—Tarifur R. Chowdhury
(74) *Attorney, Agent, or Firm*—McDonnell Boehnen Hulbert & Berghoff LLP

(57) ABSTRACT

In a liquid crystal reflecting device comprising a cell (1) formed by two cell walls (3, 4) spaced apart by spacers (5) to contain a layer (2) of a liquid crystal material, electrode structures (6, 7) on the inner faces of the walls, and a surface alignment on one or both walls to align the liquid crystal material, a diffuse specular reflector is provided by a mirror base layer (21) formed by at least two different materials that are at least partly immiscible relative to one another forming a rough surface onto which a reflective layer (22) is coated. The mirror base layer (21) is formed by at least two different polymer and/or monomer materials that are at least partly immiscible relative to one another. The reflector layer (22) may be a single sheet, formed into a plurality of separate reflector elements, or patterned into electrodes.

12 Claims, 2 Drawing Sheets

LIQUID CRYSTAL REFLECTIVE DISPLAYS

BACKGROUND OF THE INVENTION

This invention relates to liquid crystal reflective displays.

DESCRIPTION OF THE RELATED ART

Typically liquid crystal displays comprise a cell formed by two glass walls spaced apart to contain a thin layer of a liquid crystal material. Electrode structures are formed on the surface of the walls, for example the electrodes may be in the form of strips electrodes forming row and columns giving a matrix of addressable pixels at the intersections of each row and column. The display may be addressed a row at a time in a known multiplex manner.

The liquid crystal material may be nematic or long pitch cholesteric to form conventional 90° twisted nematic or super twisted nematic devices (270° twist as in U.S. Pat. No. 4,596,446), cholesteric to form phase change devices, and smectic material to form ferroelectric devices. Typical ferroelectric devices include the surface stabilised devices (SSFLCD) giving bistable devices. Such ferroelectric displays are described for example in:—N A Clark and S T Lagerwall, Applied Physics Letters Vol 36, No 11 pp 889–901, June, 1980; GB-2,166,256-A; U.S. Pat. No. 4,367,924; U.S. Pat. No. 4,563,059; patent GB-2,209,610; R B Meyer et al,. J Phys Lett 36, L69, 1975.

Another bistable device is the zenithal bistable nematic device (ZBD™) as described in WO-97/14990, PCT/GB96/02463, GB98/02806.1, and EP96932739.4. This uses a special grating surface alignment on a cell wall to allow nematic or long pitch cholesteric material to form two stable states with two different tilted alignments.

Some devices are transmissive device operating with a backlight. Others are reflective devices operating with ambient light and requiring a rear mirror. Still others operate in both transmissive and reflective modes using a semireflective mirror and a backlight.

BRIEF SUMMARY OF THE INVENTION

The present invention concerns devices using a rear mirror, either a totally or a partly reflecting mirror. Present mirrors may be formed by evaporating or spraying a reflective layer of e.g. aluminium on the rear outer wall of the cell. To form a diffuse specular reflector, it is standard to abrade the rear wall to roughen the surface prior to deposition of a reflective layer. Such an abrading step is not compatible with conventional clean room processing techniques.

According to the present invention, this problem is overcome by deposition of a polymer layer, which forms a rough surface, then coating this rough surface with a reflective layer.

According to this invention a liquid crystal device comprises a cell formed by two cell walls spaced apart by spacers to contain a layer of a liquid crystal material, electrode structures on the inner faces of the walls, and a surface alignment on one or both walls to align the liquid crystal material, characterised by:

a mirror base layer formed by at least two different materials that are at least partly immiscible relative to one another forming a rough surface onto which a reflective layer is formed to provide a diffuse specular reflector.

The layer may be a mixture of two or more monomers and or polymers of thickness between 5 and 200 nano metres, typically 10 to 50, e.g. about 30 nm. Varying the relative proportions of the mixture and/or the materials used varies the roughness of the resulting surface. The rough surface has a large number of minute protrusions and/or holes. When used inside a cell, the resulting rough surface is preferably planarised to give a uniform liquid crystal layer thickness and hence uniform appearance at each pixel. For some devices, the planarisation layer may be omitted so that partial switching and/or greyscale may be obtained.

The reflector may be on the rear wall inside or outside the cell. The reflector may be formed into electrodes or may be independent of the electrodes; in the latter case, the reflector may be a single sheet or patterned into a plurality of separate reflector elements in register with pixels defined by electrode intersections and may include light absorbent material between the reflective elements.

The liquid crystal material may be nematic, long pitch cholesteric, cholesteric, or smectic with or without chirality.

Use of two different polymers that are immiscible is described in GB-2,33,076-A to form an uneven surface with differing alignment properties for providing partial switching and greyscale in an SSFLCD. The polymer surface is deposited over electrodes on a cell wall. After deposition, the polymer surface is rubbed to give alignment.

The reflective layer may be a layer of any reflecting material, e.g. aluminium, silver, gold etc. between 1 and 100 mn thin, typically about 70 to 80 nm, depending upon whether or not a fully or partly reflecting mirror is required.

BRIEF DESCRIPTION OF THE DRAWINGS

The invention will now be described by way of example only with reference to the accompanying drawings in which.

DETAILED DESCRIPTION OF THE INVENTION

Figure 1:
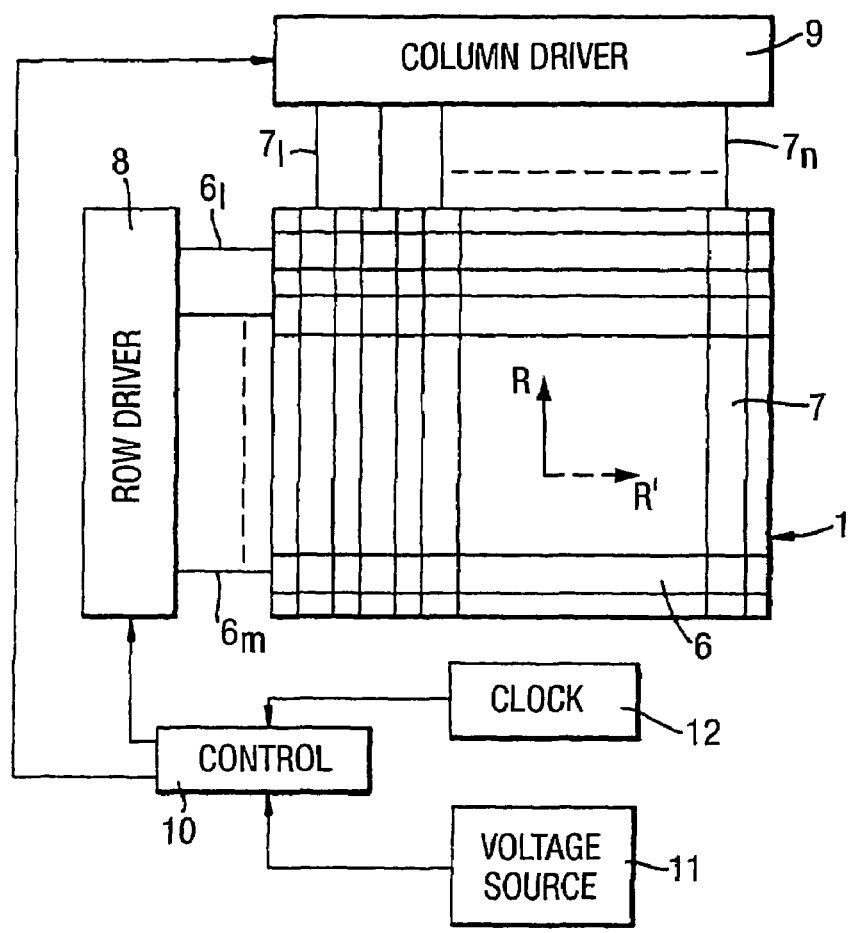
FIG. 1 is a plan view of a conventional twisted nematic matrix multiplexed addressed liquid crystal display.
Figure 2:
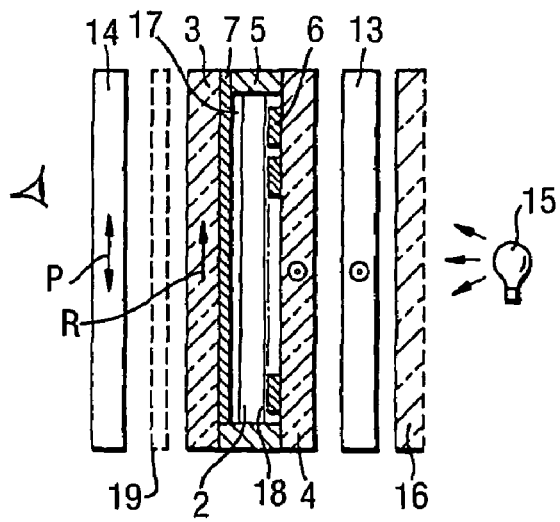
FIG. 2 is the cross section of the display of FIG. 1.

The display in FIGS. 1, 2 comprises a liquid crystal cell 1 formed by a layer 2 of nematic or long pitch cholesteric liquid crystal material contained between glass walls 3, 4. A spacer ring 5 maintains the walls typically 3–12 µm apart. Additionally numerous beads of the same dimensions may be dispersed within the liquid crystal to maintain an accurate wall spacing. Strip like row electrodes 6 e.g. of $SnO_2$ or ITO (Indium Tin Oxide) are formed on one wall 3 and similar column electrodes 7 are formed on the other wall 4 in a known manner. With m-row and n-column electrodes this forms an m×n matrix of addressable elements or pixels. Each pixel is formed by the intersection of a row and column electrode. The electrodes are covered with a thin layer 17 of polymer e.g. polyimide, which has been rubbed to give alignment to the liquid crystal material 2. For twisted nematic devices the alignment directions on the two walls are approximately orthogonal.

A row driver 8 supplies voltage to each row electrode 6. Similarly a column driver 9 supplies voltages to each column electrode 7. Control of applied voltages is from a control logic 10, which receives power from a voltage source 11 and timing from a clock 12.

Either side of the cell 1 are polarisers 13, 14 arranged with their polarisation axis substantially crossed with respect to one another and substantially parallel to the alignment directions on the adjacent wall 3, 4. Additionally one or more compensation layers 19, of e.g. stretched polymer are arranged between a cell wall under a polariser, usually at the front of the cell.

A partly reflecting mirror 16 may be arranged behind the cell 1 together with a light source 15. These allow the display to be seen in reflection and lit from behind in dull ambient lighting.

Bistable ferro electric liquid crystal devices are similar in construction, but have a different thickness of a smectic liquid crystal material, e.g. 1–5 μm thick, and a different angle between the surface induced alignment directions. Polarisers are also angled differently, e.g. about 45°.

Figure 3:
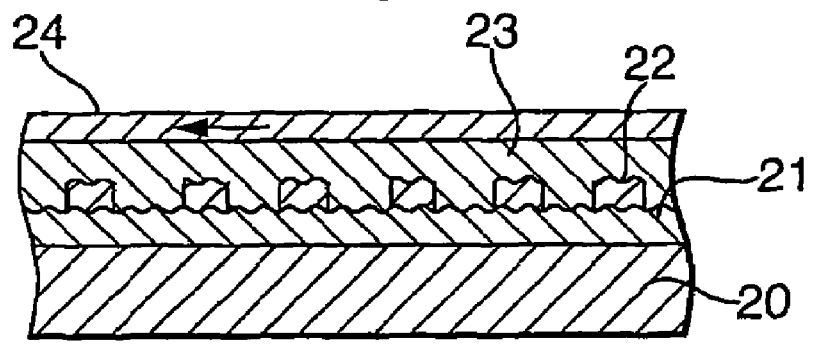
FIG. 3 is a cross section of one wall of a display according to this invention in which a reflector also forms a set of electrodes.

FIG. 3 shows a rear cell wall 20 of the present invention in which a mirror is inside the cell. The wall 20 has formed thereon a layer 21 of mixed polymers and a reflecting layer 22 of aluminium, which is patterned into column electrodes 7. A barrier layer 23 of insulating film of the polymer AT902 is formed on the reflecting layer 22 and is itself covered with a rubbed layer of polyimide to form an aligning layer 24.

In one example, the layer 21 was formed by spin coating 1 part JSR Jals 212 (obtainable from JSR of Japan) alignment polymer in 1 part butyrolactone solvent, and ⅔ part Hitachi LQT 120 (obtainable from Hitachi of Japan) alignment polymer in 1 ⅓ part NMP (N-methyl pyrrolidinone) solvent onto the glass wall. Typically the layer is spin coated at 2500 rpm for 10 seconds, the baked at 100° C. for 30 minutes to evaporate the solvents followed by 200° C. for a further 60 minutes to polymerise the layer. These components JALS 212 and LQT 120 are immiscible. The resultant layer has a relatively rough surface, typically having protrusions and or recesses of about 500–700 nm in width and 60 nm height/depth within larger feature sizes of about 1.5–3 μm. Varying the proportions of Jals 212 and LQT between 1:4 and 4:1 (and/or solvents) varies the size of the surface features and hence the degree of scattering. The same solvent may be used for both polymers; e.g. NNP can be used for both.

The reflecting layer 22 may be a layer of 20 to 100 nm or more thick alumimum. Alternatively the layer may be 20 to 100 nm silver. The layer 22 may be deposited as a complete layer (e.g. by evaporation, spraying or thick film deposition) then patterned using standard photoresist processing into strip like column electrodes, typically 100 μm wide spaced 20 μm apart. Alternatively, the electrodes may be deposited through a mask to the required dimensions.

Figure 4:
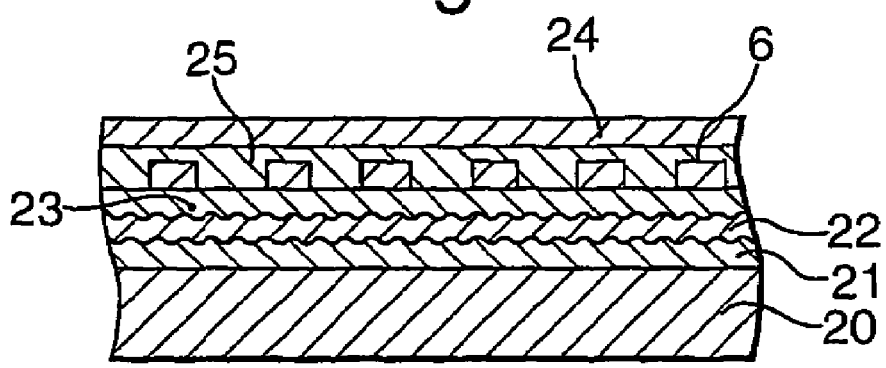
FIG. 4 is a cross section of another wall according to this invention.

FIG. 4 is similar to FIG. 3 except that the reflective layer is not formed into electrodes but is a single sheet or patterned into pixel shaped elements in register with pixels formed at intersections of row and column electrodes 6, 7. A barrier layer 23 is again formed on the reflector 22 and row electrodes 6 formed on this barrier layer 23. A further barrier layer 25 is formed on the electrodes and covered with an alignment layer of polyimide, which is rubbed to form an alignment layer 24.

Figure 5:
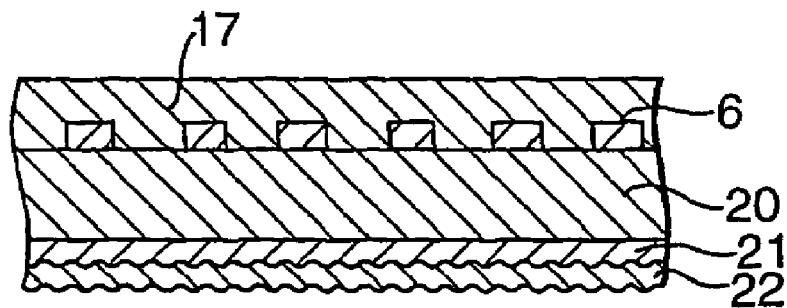
FIG. 5 is a cross section of another wall according to this invention.

FIG. 5 shows a rear cell wall with a reflector formed on the outside of the cell. The rear wall 20 carries a mixed layer 21 of immiscible polymers as in FIG. 3. The layer 21 is coated with a reflecting layer 22 of aluminium.

In a further example the two alignment materials, JALS212 and LQT120, were mixed in the proportions 1:1 by weight prior to the resultant mixture being deposited on the substrate structure by spin coating. The alignment layer was otherwise produced in the same manner as in the preceding example. Recessed areas of one alignment material were produced within raised areas of the other alignment material, the raised areas typically having a width of 100–300 nm and a length of 400–1,200 nm, and the recessed areas typically having a width of 50–200 nm and a length of 400–1,200 nm. Furthermore the height difference between the recessed areas and the raised areas was about 20 nm.

Other polymers that phase segregate (separate out on drying) may be used.

What is claimed is:

1. A liquid crystal device comprising a cell formed by two cell walls spaced apart by spacers to contain a layer of a liquid crystal material, electrode structures on the inner faces of the walls, and a surface alignment on one or both walls to align the liquid crystal material, and a mirror base layer formed by deposition of at least two different materials in solution that are at least partly immiscible relative to one another and which phase segregate to form a rough surface onto which a reflective layer is formed to provide a diffuse specular reflector.

2. The device of claim 1 wherein the mirror base layer is a mixture of two or more monomers and or polymers of thickness between 5 and 200 nanometres.

3. The device of claim 1 wherein the reflector is on the rear wall inside the cell.

4. The device of claim 1 wherein the reflector is on the rear wall outside the cell.

5. The device of claim 1 wherein the reflective layer is a single sheet layer.

6. The device of claim 1 wherein the reflective layer is formed into a plurality of electrodes.

7. The device of claim 1 wherein the reflective layer is formed into a plurality of individual reflectors in register with at least part of the electrode defined pixels.

8. The device of claim 1 wherein the thickness of the reflective layer is arranged to provide a partial reflector.

9. A cell wall for a liquid crystal device, the cell wall comprising an inner face, electrode structures on the inner face, and a surface alignment to align liquid crystal material, and a mirror base layer formed by deposition of at least two different materials in solution that are at least partly immiscible relative to one another and which phase segregate to form a rough surface onto which a reflective layer is formed to provide a diffuse specular reflector.

10. A liquid crystal device comprising a cell wall according to claim 9.

11. A method of forming a cell wall for a liquid crystal device, the method comprising the steps of:
    depositing at least two materials in solution onto the cell wall, the at least two materials being chosen such that they phase segregate with respect to each other;
    allowing the at least two materials to phase segregate whereby to form a rough surface onto which a reflective layer may be formed to provide a diffuse specular reflector.

12. A method of forming a liquid crystal device comprising a cell formed by two cell walls spaced apart by spacers to contain a layer of a liquid crystal material, electrode structures on the inner faces of the walls, and a surface alignment on one or both walls to align the liquid crystal material, the method comprising the step of:
    forming a mirror base layer for at least one cell wall by coating with at least two different materials that are at least partly immiscible relative to one another and which phase segregate to form a rough surface onto which a reflective layer can be formed to provide a diffuse specular reflector; and
    coating the rough surface of the mirror base layer with a reflective material.

* * * * *